United States Patent
Kunkel et al.

(10) Patent No.: US 6,570,173 B1
(45) Date of Patent: May 27, 2003

(54) DEVICE FOR DISINFECTING WATER FLOWING THROUGH A SANITARY FACILITY

(75) Inventors: Horst Kunkel, Stuttgart (DE); Erwin Reich, Stuttgart (DE)

(73) Assignee: Hansa Metallwerke AG, Stuttgart (DE)

( * ) Notice: Subject to any disclaimer, the term of this patent is extended or adjusted under 35 U.S.C. 154(b) by 0 days.

(21) Appl. No.: 09/529,932

(22) PCT Filed: Jul. 22, 1999

(86) PCT No.: PCT/EP99/05230
§ 371 (c)(1),
(2), (4) Date: Jun. 26, 2000

(87) PCT Pub. No.: WO00/10925
PCT Pub. Date: Mar. 2, 2000

(30) Foreign Application Priority Data

Aug. 21, 1998 (DE) .......................................... 198 38 007

(51) Int. Cl.[7] .................................................. C02F 1/32
(52) U.S. Cl. .................. 250/504 R; 250/365; 250/435; 250/436; 250/423 R; 422/24
(58) Field of Search ............................. 250/504 R, 365, 250/435, 436, 432 R; 422/24

(56) References Cited

U.S. PATENT DOCUMENTS

| 4,017,734 A | | 4/1977 | Ross | |
| 5,505,912 A | * | 4/1996 | Hallett | 422/186.3 |
| 5,626,768 A | * | 5/1997 | Ressler et al. | 210/748 |

FOREIGN PATENT DOCUMENTS

| DE | 41 11 663 A1 | 10/1991 | ............ C02F/1/32 |
| DE | 296 14 998 U1 | 5/1996 | ............ E03C/1/04 |
| DE | 197 53 505 A1 | 3/1997 | ............ B01J/19/12 |
| DE | 297 04 749 U1 | 3/1997 | ............ B01J/19/12 |
| EP | 0 508 338 A1 | 4/1992 | ............ C02F/1/32 |
| EP | 0 622 337 A1 | 1/1994 | ............ C02F/1/32 |
| FR | 2 755 296 A1 | 10/1997 | ............ H01J/65/04 |
| GB | 710903 | 2/1952 | |

OTHER PUBLICATIONS

Patent Abstracts of Japan, App. No. 06/088,575, Filed Apr. 26, 1994, Inventor Yoshikawa Kazuhiko, Title: Ultraviolet Ray Raidating Device.

Deutschs Patent—und Markenamt, Apr. 21, 1999, Priority 198 38 007.0–41.

Patent Abstracts of Japan, App. No. 06/239,729, Date Aug. 26, 1994, Inventor: Honda Hajime, Title: Ultraviolet–Sterilized Faucet, International Search Report, PCT/EP99/05230, 6 pgs.

* cited by examiner

Primary Examiner—John R. Lee
Assistant Examiner—Nikita Wells

(57) ABSTRACT

A device for sterilizing water flowing through a sanitary appliance, e.g. a bathtub outlet (1), comprises a UV lamp (12), which is disposed in a housing (2, 3, 4) having a housing jacket (2) and the radiation of which is directed towards the water flowing through. Disposed in the housing (2, 3, 4) is a throughflow chamber (17), which surrounds the UV lamp (12). The UV lamp (12) has a substantially rod-shaped lamp body (32). The latter is surrounded by a protective tube (19) made substantially of a material which transmits UV light. The protective tube (19) prevents a flow directly against the lamp body (32). The lamp body (32) is supported against the protective tube (19) via supporting means (38, 39), which allow only a low heat transfer between the protective tube (19) and the lamp body (32).

10 Claims, 2 Drawing Sheets

DEVICE FOR DISINFECTING WATER FLOWING THROUGH A SANITARY FACILITY

Figure 1:
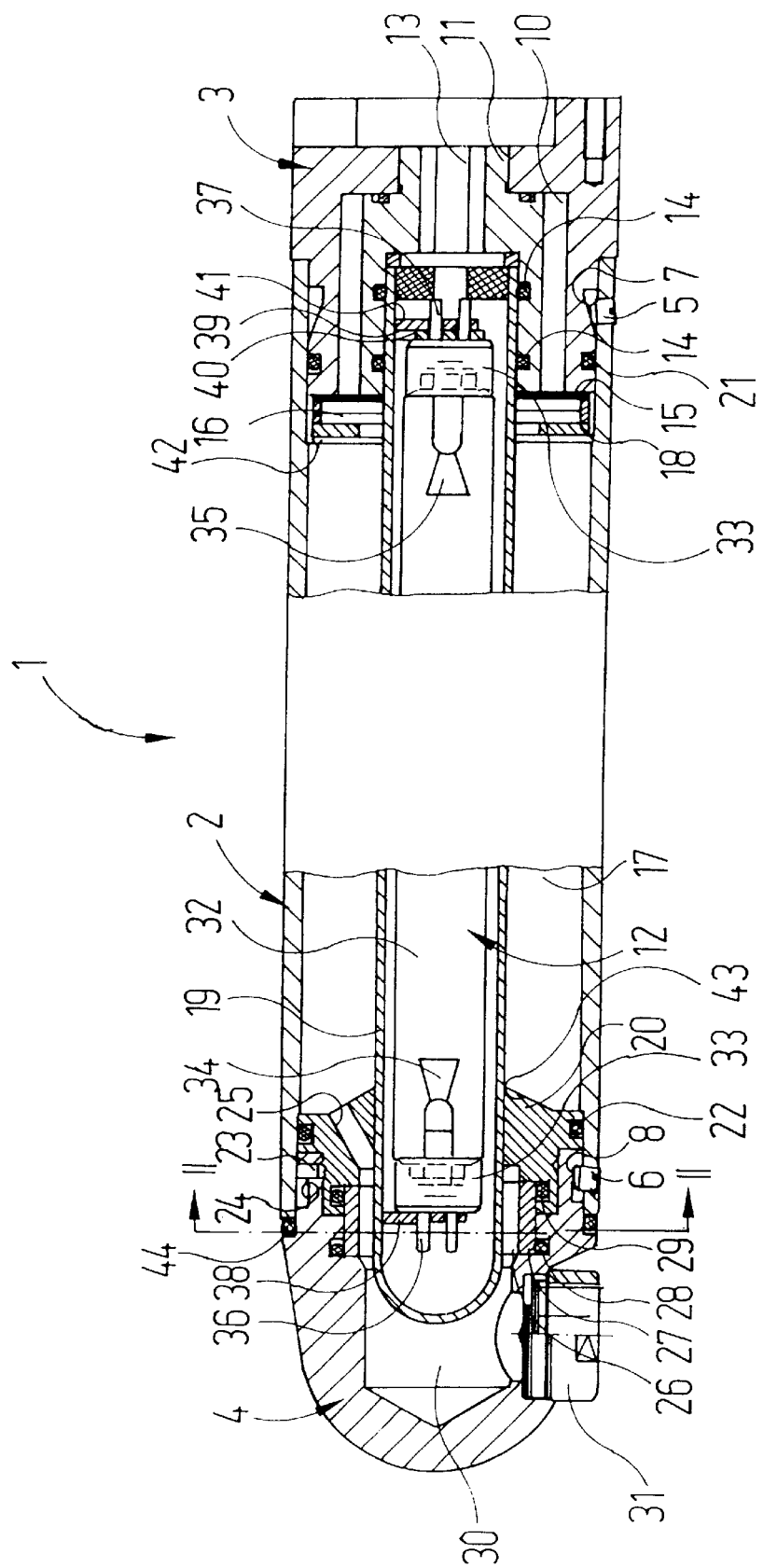

The invention relates to a device for sterilizing water flowing through a sanitary appliance, having a) a housing, which comprises an inlet and an outlet for the water;

b) a UV lamp, which is disposed inside the housing and the radiation of which is directed towards the water flowing through; and c) a throughflow chamber for the water, which is disposed in the housing and surrounds the UV lamp.

In recent years the dangers arising in the field of sanitation from water contaminated with micro-organisms, in particular bacteria, amoebae or other monocellular organisms, have become ever clearer. For said reason, increased importance is being attached to water sterilization. In said connection, there have been reports of experiments to sterilize flowing water through exposure to UV light, which is of a wavelength suitable for killing micro-organisms carried along in the water. In said case, the water to be sterilized flows around the UV lamp.

It is known that the sterilizing effect of such a UV lamp is dependent upon parameters such as the radiation capacity and the radiated wavelength spectrum of the lamp and that said parameters in turn are dependent upon the operating temperature of the lamp body of the UV lamp. In known devices, the high thermal contact with the water flowing around the lamp influences the temperature of the lamp body. The extent of said influence depends upon the temperature of the water and the flow rate of the water. Different water removal conditions, such as e.g. a different water temperature or different levels of water removal, lead to correspondingly different operating temperatures of the lamp body.

Changes of the operating parameters of the lamp body which lead to a reduction of the sterilizing efficiency arise as a result. In order nevertheless always to achieve an adequate sterilizing effect, the UV lamps of such known devices are required, for safety reasons, to be overrated in terms of their capacity, which has a corresponding disadvantageous effect upon the cost of constructing and operating the device. An additional drawback arises when, as a result of the absorption of the overrated radiant power of the UV lamp, the sterilizing device heats up in a way that makes it difficult to handle or reduces its operational reliability.

The object of the present invention is therefore to develop a device of the type described initially in such a way that the efficiency of the UV lamp is not influenced by different water removal conditions.

Said object is achieved according to the invention in that d) the lamp comprises a substantially rod-shaped lamp body;

e) the lamp body is surrounded by a protective tube, which is made substantially of a UV-light-transmitting material and prevents a flow directly against the lamp body; and that f) the lamp body is supported against the protective tube by means of supporting means, which allow only a low heat transfer between the protective tube and the lamp body.

A substantially rod-shaped lamp body has a relatively large lateral surface, past which the water to be sterilized flows. The water, as it flows past from the upstream to the downstream end of the throughflow chamber, is continuously exposed to irradiation by the UV lamp and may therefore be effectively sterilized. In so doing, it does not flow directly in contact with the lamp body but is separated from the latter by a protective tube, which transmits UV light.

Said protective tube is used to isolate the sensitive lamp body from direct contact with the water. By virtue of the supporting means, which support the lamp body relative to the protective tube and form only a slight thermal bridge between the lamp body and the protective tube, the temperature of the lamp body is practically uninfluenced by the temperature of the protective tube, which is determined by the heat exchange with the water flowing past. It is therefore possible under all water removal conditions for the lamp to be kept at an optimum operating temperature, at which it has the best sterilizing effect.

In an advantageous refinement of the invention, the supporting means are supported against an inner lateral surface of the protective tube. Such an arrangement for supporting the lamp body inside the protective tube is simple and places no high demands on the shaping of the supporting means.

Advantageously, the supporting means are applied only via edges against the inner lateral surface of the protective tube. As a result, the region contributing towards heat transfer is reduced compared to a surface-type support.

In a particularly advantageous manner, the supporting means are applied only via tips against the inner lateral surface of the protective tube. This leads to an even greater reduction of the region which may contribute towards heat transfer.

In an advantageous embodiment of the present invention, the supporting means, viewed in the direction of the lamp axis, have the external contour of a polygon. Such supporting means have an uncomplicated geometry and are accordingly inexpensive to manufacture.

In a particularly advantageous construction, the polygon is a triangle. A triangle has the minimum number of outside edges enabling a stable support of the lamp body against the inner lateral surface of the protective tube.

In a further advantageous refinement of the invention, a resilient connection is formed by at least one of the supporting means between the lamp body and the protective tube. Such a resilient connection may absorb thermal stresses which arise during operation of the UV lamp. It moreover protects the lamp body from damage caused by vibrations which may be generated e.g. by the water flowing past or by operation of the UV lamp itself.

The supporting means advantageously support the lamp body at both ends. A stable and secure mounting of the lamp body is thereby guaranteed.

In a further advantageous refinement of the invention, the lamp body comprises projections protruding from either end and the supporting means are mounted, at the lamp body side, on the protruding projections. Such projections may, for example, be conditional upon the method of manufacturing the lamp. The mounting on said projections dispenses with the need to provide receiving devices for the supporting means on the lamp body in a separate step.

The projections are advantageously electrical connection means of the UV lamp. Besides receiving the supporting means, projections designed in said manner additionally perform the function of electrical contacting of the UV lamp.

Figure 2:
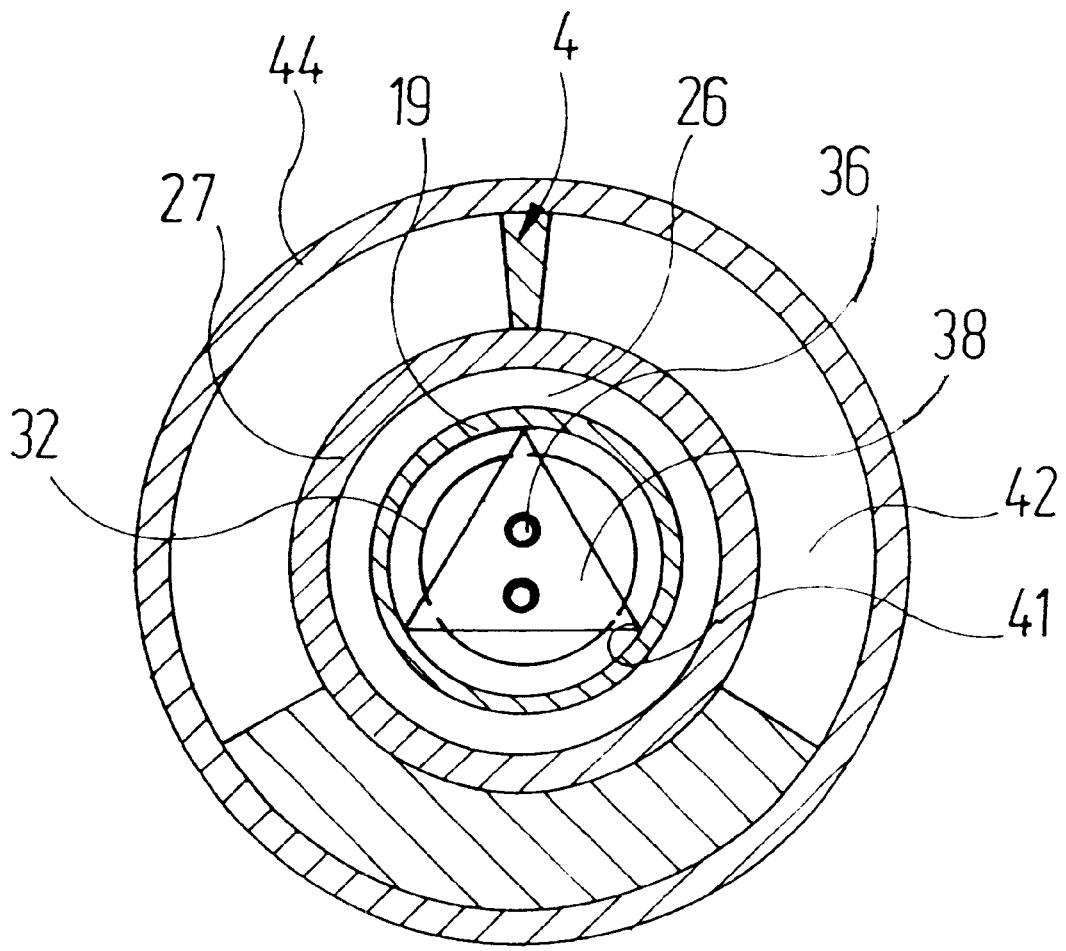

An embodiment of the invention is described in greater detail below with reference to the drawings; said drawings show:

FIG. 1 a bathtub outlet, which is provided with a device for sterilizing water flowing through it;

FIG. 2 a section through FIG. 1 along line II—II to an enlarged scale.

The bathtub outlet, which is denoted as a whole by the reference character 1, comprises a substantially hollow-cylindrical housing jacket 2 which is closed at one end, situated on the right in FIG. 1 and adjacent to a building wall, by an assembly base 3 and at its opposite end by an outlet head 4. Assembly base 3 and outlet head 4 are fitted on the housing jacket 2 in each case by means of a grub screw 5 or 6, which penetrates the housing jacket 2 and engages into a circumferential groove 7 or 8 in the assembly base 3 or outlet head 4 respectively.

The water for removal through the bathtub outlet 1 is introduced via a water supply connection piece (not shown in the drawings) initially into an annular inlet 10 of the bathtub outlet 1 situated inside the assembly base 3. The inlet 10 is delimited in a radially inward direction by a backplate 11 for holding a rod-shaped UV lamp denoted as a whole by. 12. Besides the holder for the UV lamp 12, the backplate 11 comprises a bushing 13 for receiving electric connecting cables (not shown) of the UV lamp 12. The end of the UV lamp 12 directed towards the backplate 11 is sealed off to prevent water penetration by means of two sealing rings 14, which are situated in corresponding inner circumferential grooves of the backplate 11.

From the inlet 10 the water passes through a screen 15, which is fitted into the housing jacket 2 by means of a flange ring 42, into an ante-chamber 16. Upon transfer from said ante-chamber 16 into a throughflow chamber 17, the water has to overcome the increased flow resistance of an annular baffle plate 18, which reduces the flow area in such a way that it is limited to a radially inner subregion of the original flow area. The throughflow chamber 17 is substantially in the shape of a hollow cylinder, of which the outer lateral surface is formed by the housing jacket 2 and the inner lateral surface is formed by a protective tube 19. The protective tube 19 at its upstream end is sealed by the backplate 11 and at its downstream end is integrally closed. It is made of UV-transmitting quartz glass. At its downstream end face, the throughflow chamber 17 is delimited by a through-insert 20. Upstream relative to the assembly base 3 and downstream relative to the through-insert 20 the throughflow chamber 17 is sealed off from the outside by sealing rings 21 and 22, which are situated in corresponding circumferential grooves of the assembly base 3 and through-insert 20 respectively.

The through-insert 20 is fixed on the outlet head 4 by means of a grub screw 23, which penetrates the outlet head 4 and engages into a circumferential groove 24 in the through-insert 20.

Opening into an end face 43 of the through-insert 20 delimiting the throughflow chamber 17 is a through-bore 25, which is situated in FIG. 1 above the UV lamp 12 and connects the throughflow chamber 17 to an annular sub-chamber 26. The radially outer surface of the sub-chamber 26 is formed by a ring 27, which transmits UV light and around which are disposed two sealing rings 28 and 29, which are situated in corresponding circumferential grooves of the through-insert 20 and outlet head 4 respectively and seal off the sub-chamber 26 from the outside.

From the sub-chamber 26 the water finally flows into an outlet chamber 30, which is delimited by the downstream end of the protective tube 19 and by the outlet head 4 and communicates with an air spout 31.

There now follows a description of the structure of the UV lamp 12 with the protective tube 19 surrounding it:

A lamp body 32 of the UV lamp 12 is enclosed by the protective tube 19. The lamp body 32 at both ends has boundary regions 33, the diameter of which is slightly smaller than the diameter of the middle region. Fastened inside each boundary region 33 is an electrode 34 or 35, the inner end of which projects into the middle region of the lamp body 32. The electrical connections of the electrodes 34 and 35, which are led out of both end faces of the lamp body 32, are denoted by 36 and 37 respectively. Each of said connections 36 and 37 comprises two pins protruding from the end face of the lamp body 32. A supporting element 38 is positively mounted over the two pins of the electrical connection 36 and a supporting element 39 is likewise positively mounted over the two pins of the electrical connection 37.

Between the end face of the lamp body 32 directed towards the backplate 11 and the supporting element 39 disposed there, a distance piece 40 is mounted onto the pins of the electrical connection 37. For the sake of clarity, electric connecting cables for connecting the UV lamp 12 to a power supply device are not shown in FIG. 1.

From FIG. 2 in conjunction with FIG. 1 it is evident how the supporting elements 38 and 39, which are triangular in cross section, support the lamp body 32 of the UV lamp 12 in the protective tube 19. Said lamp body 32 and protective tube 19 are coaxial with one another in such a way that a radial clearance, which is constant between the boundary regions 33 of the lamp body 32, is maintained between the outer lateral surface of the lamp body 32 and the inner lateral surface of the protective tube 19. The supporting elements 37 and 3S in said case rest against the inner lateral surface of the protective tube 19 in such a way that they are in contact with said surface only via peripheral edge regions 41.

From FIG. 2 it is also evident that the annular sub-chamber 26 is delimited in a radially inward direction by the protective tube 19 and in a radially outward direction by the ring 27. The outlet head 4 has recesses 42 which, in conjunction with the ring 27 which transmits UV light, allow operation of the UV lamp to be visually checked from the outside, as will be explained below.

In the section of FIG. 2, the recesses 42 and/or the outlet head 4 are delimited in a radially outward direction by a sealing ring 44, which is made of a translucent material and, when the bathtub outlet 1 is assembled, is mounted over a corresponding peripheral recess of the outlet head 4 before the housing jacket 2 is pushed onto the outlet head 4 (cf. FIG. 1).

The described device operates as follows:

Upon the removal of water through the bathtub outlet 1, water flows from the inlet 10 through the sub-chamber 16 into the throughflow chamber 17. In so doing, it wets the lateral surface of the protective tube 19 and hence comes into thermal contact with the latter. As a result, after a specific removal time the protective tube 19 has the same temperature as the removal water. The low thermal contact, which the lamp body 32 has with the protective tube 19 via the supporting elements 38 and 39, means that the heat exchange between lamp body 32 and protective tube is negligibly low. The temperature of the lamp body 32 is therefore substantially independent of whether and at what temperature water is removed. The temperature of the lamp body 32 is exclusively dependent upon the operating conditions of the UV lamp 12. The latter may therefore be selected in such a way that an optimized sterilizing efficiency of the UV lamp 12 is achieved.

Operation of the UV lamp may additionally be visually checked:

Visible light fractions emitted by the UV lamp or generated by fluorescence,of the UV light penetrate radially through the light-transmitting protective tube 19, the subchamber 26, the ring 27, the recesses 42 and the sealing ring 44 towards the outside (cf. FIG. 2). When the lamp is in operation it is possible, simply by visually checking whether light from inside is passing through the sealing ring 44 towards the outside, to determine reliably whether the UV lamp is actually burning.

What is claimed is:

1. A device for sterilizing water flowing through a sanitary appliance, having
   a) a housing, which comprises an inlet and an outlet for the water;
   b) a UV lamp, which is disposed inside the housing and the radiation of which is directed towards the water flowing through;
   c) a throughflow chamber for the water, which is disposed in the housing and surrounds the UV lamp;
   wherein
   d) the UV lamp (12) comprises a substantially rod-shaped lamp body (32);
   e) the lamp body (32) is surrounded by a protective tube (19), which is made substantially of a UV-light-transmitting material and prevents a flow directly against the lamp body (32); and
   f) the lamp body (32) is supported against the protective tube (19) by means of supporting means (38, 39), which allow only a low heat transfer between the protective tube (19) and the lamp body (32).

2. A device as claimed in claim 1, wherein the supporting means (38, 39) are supported against an inner lateral surface of the protective tube (19).

3. A device as claimed in claim 2, wherein the supporting means (38, 39) are applied only via edges (41) against the inner lateral surface of the protective tube (19).

4. A device as claimed in claim 2, wherein the supporting means (38, 39) are applied only via tips against the inner lateral surface of the protective tube (19).

5. A device as claimed in claim 1, wherein the supporting means (38, 39), viewed in the direction of the lamp axis, have an external contour of a polygon.

6. A device as claimed in claim 5, wherein the polygon is a triangle.

7. A device as claimed in claim 1, wherein a resilient connection is formed by at least one of the supporting elements (38, 39) between the lamp body (32) and the protective tube (19).

8. A device as claimed in claim 1, wherein the supporting means (38, 39) support the lamp body (32) at both ends of the lamp body.

9. A device as claimed in claim 1, wherein the lamp body (32) comprises projections (36, 37) protruding from either end of the lamp body and the supporting means (38, 39) are mounted, at the lamp body side, on the protruding projections (36, 37).

10. A device as claimed in claim 9, wherein the projections (36, 37) are electrical connection means of the UV lamp (12).

* * * * *